Aug. 14, 1934.   J. C. BOGLE   1,969,961

BURNER CONTROL APPARATUS AND SYSTEM

Original Filed June 3, 1929   7 Sheets-Sheet 1

Inventor:
John C. Bogle.
By Jones, Addington, Ames & Seibold
Attys.

Witness:
David S. Magnussen

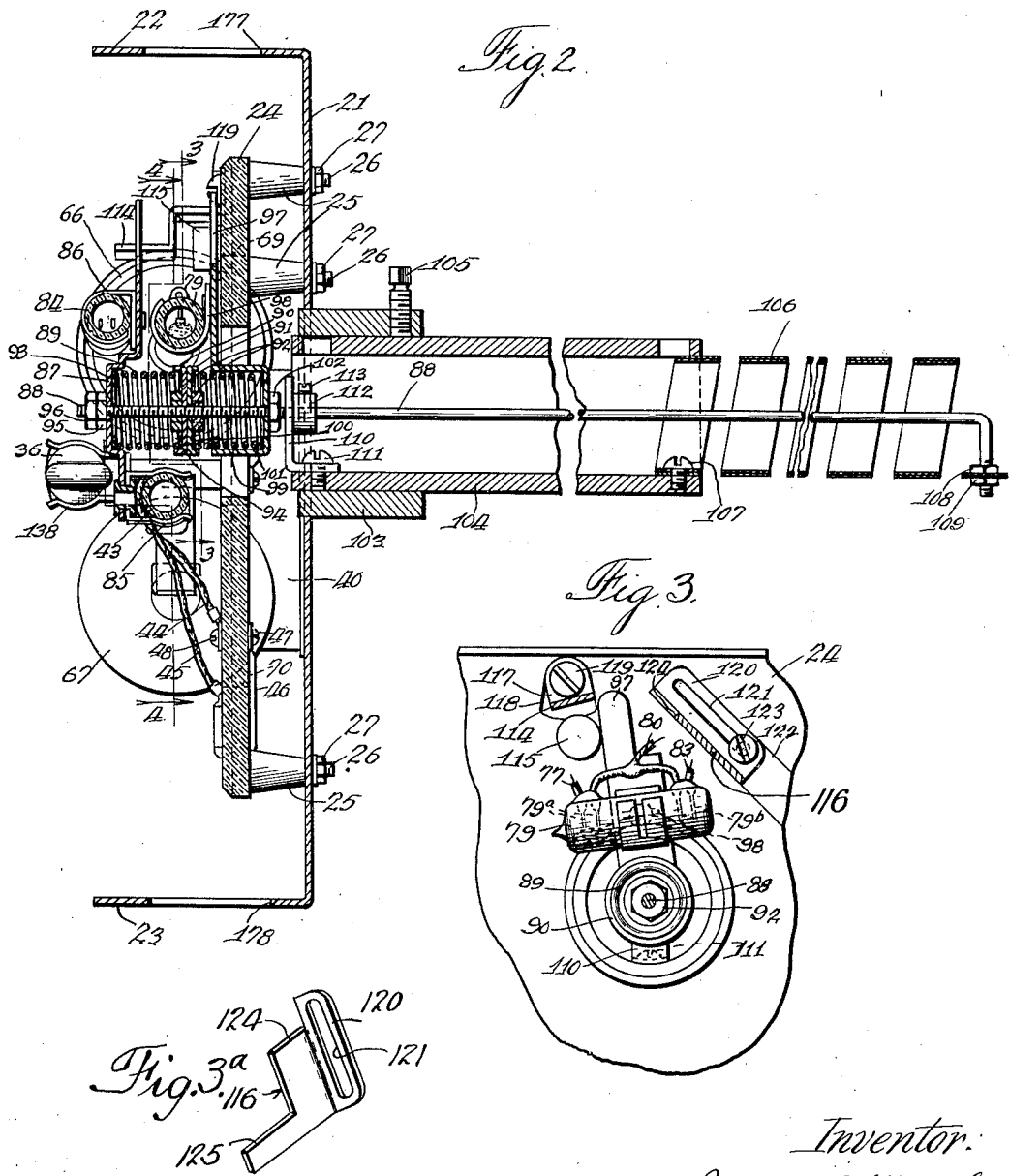

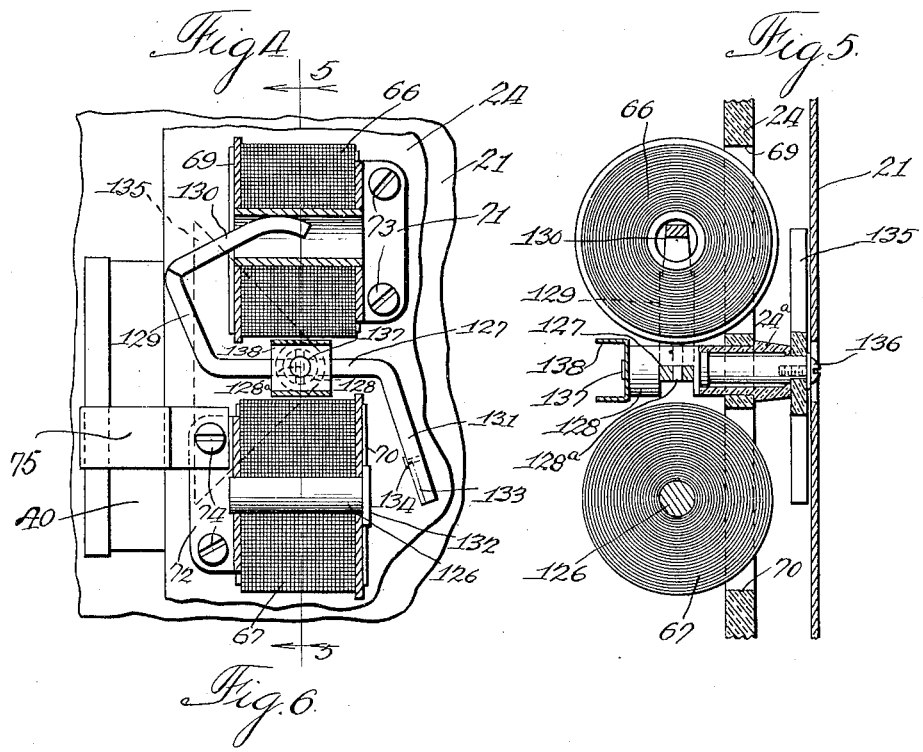
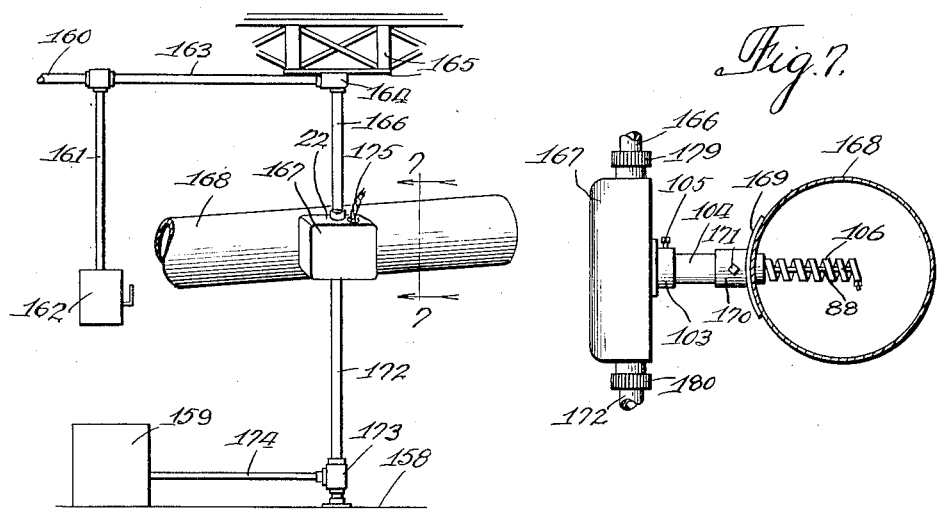

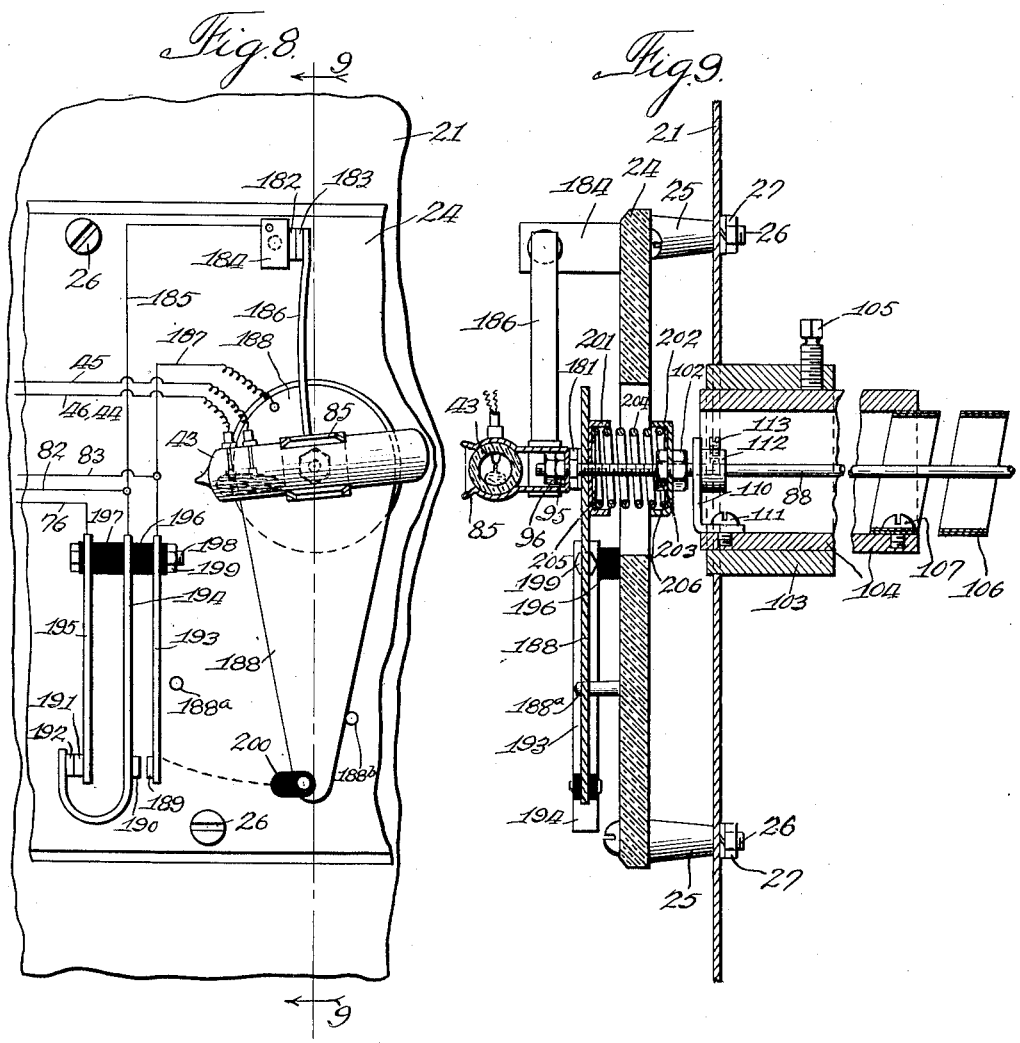

Aug. 14, 1934.   J. C. BOGLE   1,969,961
BURNER CONTROL APPARATUS AND SYSTEM
Original Filed June 3, 1929   7 Sheets-Sheet 5
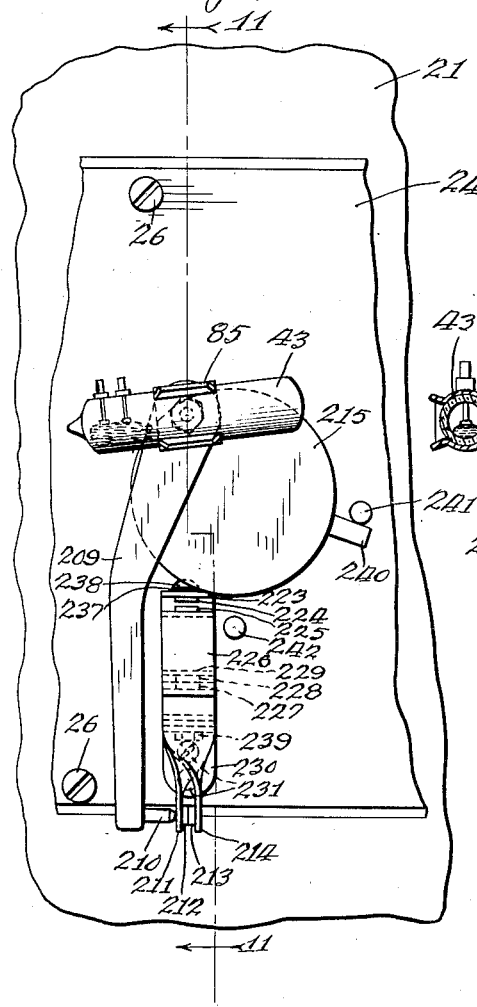
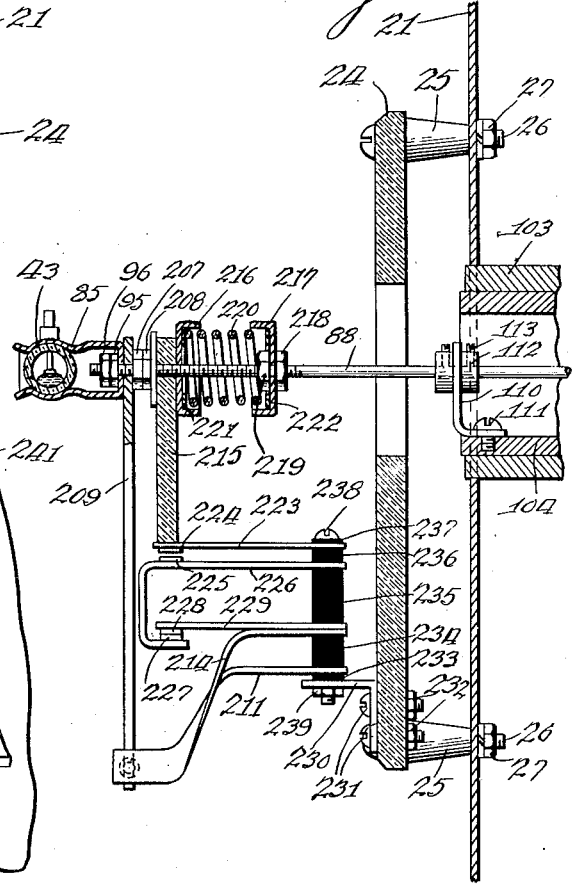
Inventor
John C Bogle
By Jones, Addington, Ames & Seibold
Attys.
Witness
David S. Magnusson Aug. 14, 1934.    J. C. BOGLE    1,969,961
BURNER CONTROL APPARATUS AND SYSTEM
Original Filed June 3, 1929    7 Sheets-Sheet 6
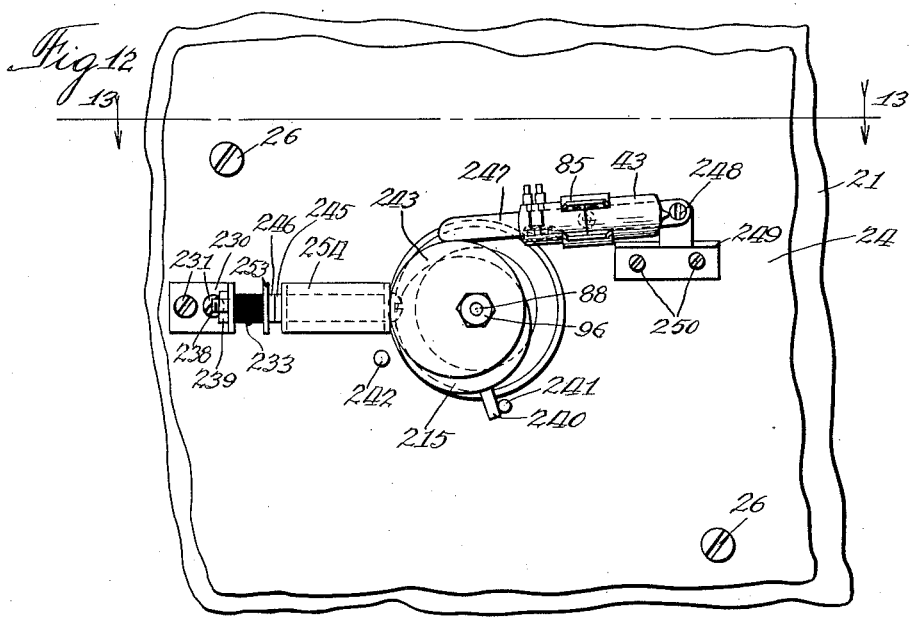
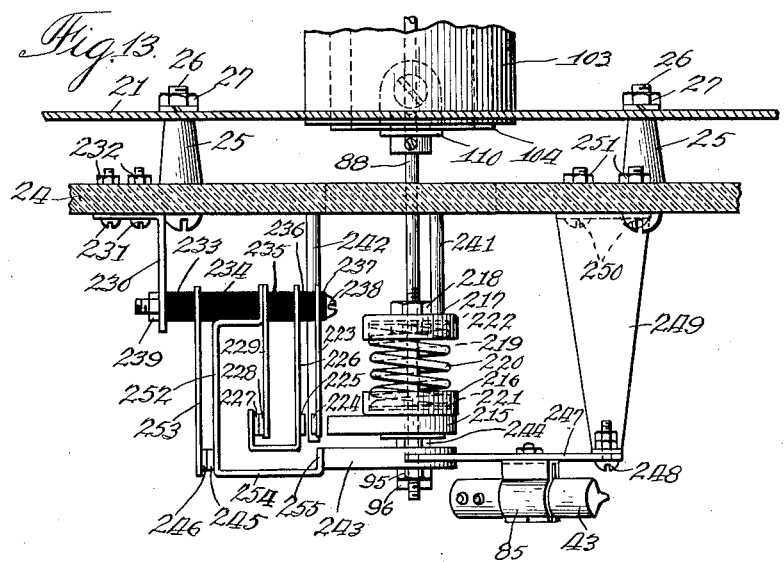
Inventor:
John C. Bogle

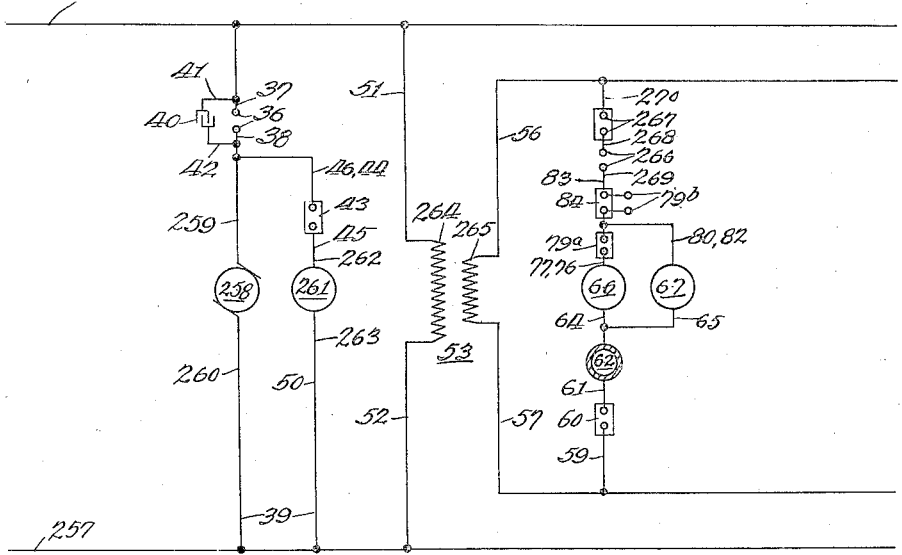
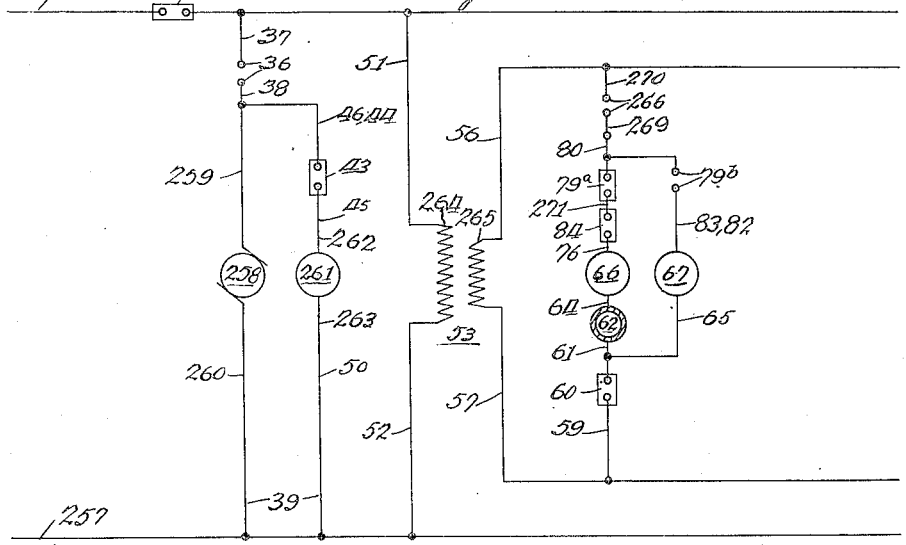

Patented Aug. 14, 1934

1,969,961

UNITED STATES PATENT OFFICE 1,969,961

BURNER CONTROL APPARATUS AND SYSTEM

John C. Bogle, River Forest, Ill., assignor, by mesne assignments, to Minneapolis-Honeywell Regulator Company, Minneapolis, Minn., a corporation of Delaware Application June 3, 1929, Serial No. 367,984
Renewed October 6, 1933

12 Claims. (Cl. 158—28)

This invention relates to electrical control apparatus and systems, preferably automatically controlled heating systems, and it has special reference to the construction, assembly, installation and circuit connections of such apparatus in systems for automatically controlling the operation of oil burners and the like for heating systems.

The apparatus heretofore developed for controlling the operation of systems of the character referred to and for providing the essential protective features in such systems has included a considerable number of separate devices requiring a great deal of skilled labor in installing and interconnecting the apparatus to constitute complete and operative systems. Experience with different types of systems has shown that means must be provided for affording protection against numerous hazards and undesirable operating conditions, and the provision of such protective apparatus has led to a great complication of apparatus and connections in the systems now in use.

The present invention has for its primary object the provision of an improved assembly of apparatus which may be advantageously installed with a minimum of skilled labor and without detracting in any way from the protection afforded in the system.

Another object of the invention is to provide improved systems of electrical circuit connections for controlling apparatus of the type designed in accordance with the invention.

Other objects and advantages of the invention will appear from a consideration of the following detailed description in conjunction with the accompanying drawings, in which:

Fig. 2 is a vertical sectional view taken on the line 2—2 of Fig. 1;

Fig. 3 is a fragmentary view taken on the line 3—3 of Fig. 2, showing certain of the parts in vertical section and others in front elevation;

Figure 1:
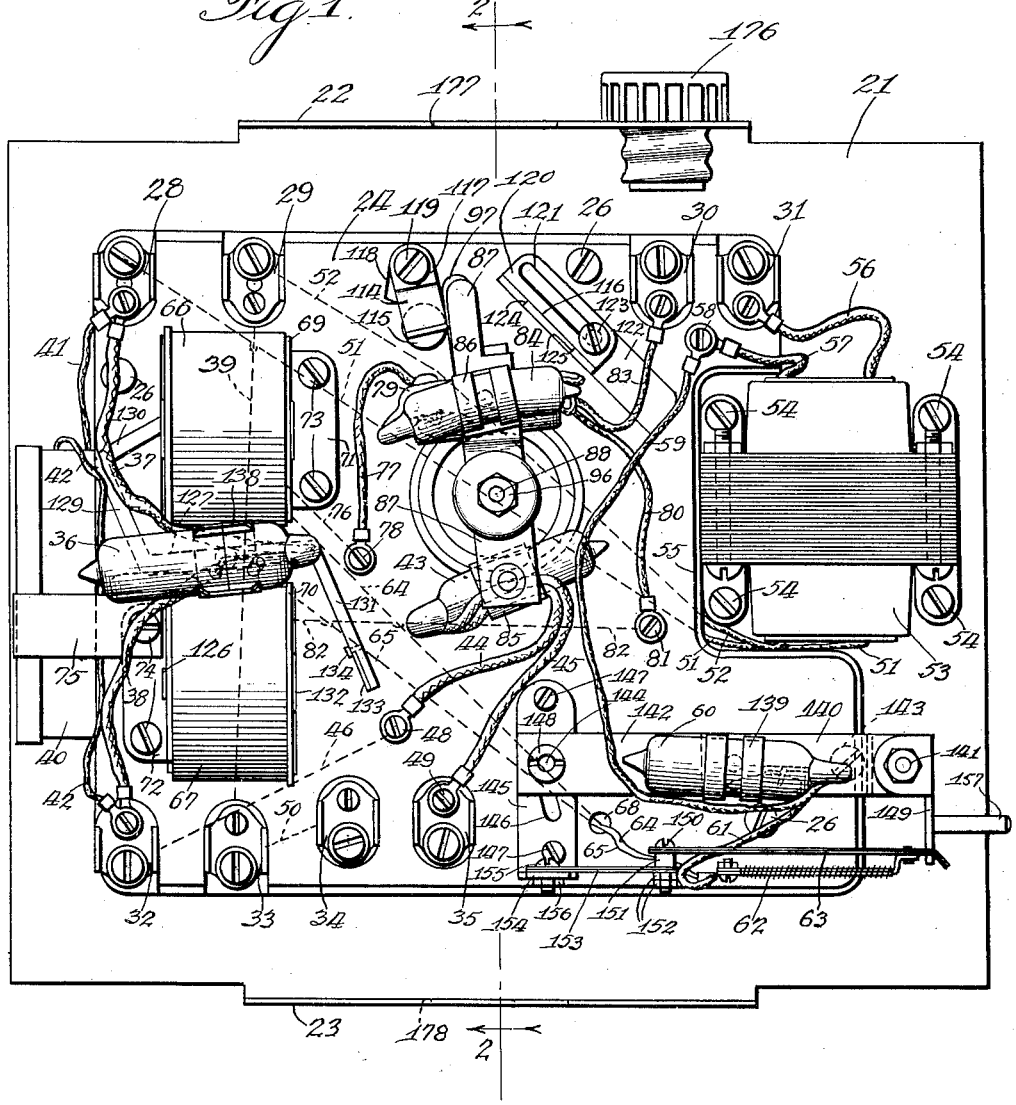
Figure 1 is a front elevational view of an assembly of control apparatus designed in accordance with the invention.

Fig. 3ª is a perspective view of one of the parts shown in Figs. 1 and 3;

Fig. 4 is a fragmentary view taken on the line 4—4 of Fig. 2, and also showing certain parts in vertical section and others in front elevation;

Fig. 5 is a fragmentary vertical sectional view taken on the line 5—5 of Fig. 4;

Fig. 6 is a diagrammatic view illustrating a preferred manner of installing the apparatus designed in accordance with the invention;

Fig. 7 is a fragmentary view taken on the line 7—7 of Fig. 6, showing certain of the parts in vertical section and others in side elevation;

Fig. 8 is a fragmentary front elevational view illustrating a modified form of apparatus which may be utilized instead of the corresponding parts shown in Figs. 1, 2 and 3;

Fig. 9 is a fragmentary vertical sectional view taken on the line 9—9 of Fig. 8;

Fig. 10 is a fragmentary front elevational view illustrating another modified form of apparatus which may be utilized instead of the corresponding parts illustrated in Figs. 1, 2 and 3;

Fig. 11 is a fragmentary vertical sectional view taken on the line 11—11 of Fig. 10;

Fig. 12 is a fragmentary front elevational view illustrating still another modification of apparatus which may be utilized instead of the corresponding parts shown in Figs. 1, 2 and 3;

Fig. 13 is a view partly in top plan and partly in horizontal section, taken on the line 13—13 of Fig. 12;

Fig. 14 is a schematic representation of an improved system of circuit connections designed for use in connection with the apparatus disclosed in the previous figures; and Fig. 15 is a schematic representation of a modified system of circuit connections designed for the same use.

Referring first to Figs. 1 to 5, inclusive, of the drawings, the apparatus disclosed consists of a sheet metal member 21 forming the base plate for supporting the devices to be described presently, and also constituting the rear wall of a casing for said apparatus. The member 21 comprises two forwardly extending portions 22 and 23 respectively located at the top and bottom of said member and constituting portions of the top and bottom walls of the casing for the apparatus to be described. It will be understood that the enclosure of the apparatus will be completed by the provision of a suitable cover cooperating with the member 21. The showing of such a cover is omitted in these figures of the drawings for convenience.

A mounting base 24 of molded insulating material, or other suitable composition, is supported in forwardly spaced relation to the rear casing wall constituted by the sheet metal member 21 by means of legs 25, which may be either integrally formed with said mounting base 24 or separately formed and suitably secured to said base. Securing screws 26 and cooperating nuts 27 extend through certain of the legs 25 which are made hollow for that purpose, and also through suitable holes in the rear casing wall 21 and in the base 24 to secure the latter rigidly in position.

Terminal members 28, 29, 30, 31, 32, 33, 34 and 35 are secured to the front face of the base 24 near the upper and lower edges thereof and are provided with suitable screws for the attachment of circuit connectors thereto. The terminals 28 and 29 are adapted to have a supply circuit connected thereto. The two electrodes of a mercury contactor 36 are connected between the terminals 28 and 32 by means of flexible conducting leads 37 and 38, and the terminal 29 is directly connected to the terminal 33 by means of a conductor 39 located on the rear of the base 24. The terminals 32 and 33 are thus connected through the switch 36 to the supply circuit that is connected to the terminals 28 and 29. These terminals 32 and 33 are adapted to have connected thereto conductors extending to the motor or other actuating mechanism of an oil burner or similar device, whereby the operation of such device will be controlled by the switch 36. A condenser 40 is also preferably connected between the terminals 28 and 32 by means of conductors 41 and 42, for the purpose of reducing arcing between the electrodes of the switch 36, it being apparent that the condenser 40 is thus connected directly in parallel with the contactor 36.

A mercury contactor 43 is connected between the terminals 32 and 35 by means of flexible conducting leads 44 and 45 and a conductor 46 located on the back of the base 24. The conductor 46 extends from the terminal 32 to a terminal which may be suitably constituted by an internally screw-threaded metallic insert in the base 24, and is connected to said insert by a screw 47. The flexible lead 44 is similarly connected by a screw 48 to the forward extremity of the same metallic insert to complete the connection between the conductors 44 and 46. The flexible lead 45 is shown as extending directly from one terminal of the switch 43 to the terminal 35 and being connected to the latter by a connecting screw 49. It will be understood, of course, that the flexible lead 44 might similarly extend and be connected to the terminal 32, if desired, the use of the conductor 46 on the back of the base 24 in conjunction with the connecting screws 47 and 48 and the terminal constituted by the metallic insert into which these screws are threaded being merely for the purpose of convenience in construction and assembly of the apparatus.

The terminal 34 is directly connected to the terminal 33 by means of a conductor 50 on the back of the base 24, and thus a permanent connection is established from the line terminal 29 to the terminal 34, which latter terminal and the terminal 35 are adapted to have connected thereto conductors extending to the ignition device of the burner system. With this arrangement it will be seen that the ignition circuit is connected to the supply conductors extending to the terminals 28 and 29 through the switches 36 and 43 in series.

Two conductors 51 and 52 are also disposed on the back of the base 24 and extend from the line terminals 28 and 29, respectively, to the primary winding of a transformer 53 that is utilized to supply current to certain of the control apparatus at a reduced voltage. The frame of this transformer is preferably secured directly to the rear plate 21 of the casing by screws 54, the base 24 being suitably cut away, as indicated at 55, to provide room for the transformer. One terminal of the secondary winding of the transformer 53 is connected through a conducting lead 56 to the terminal 31 and the other terminal of this secondary winding is connected through a conducting lead 57, a connecting screw 58 and a flexible conducting lead 59 to one of the two electrodes of a mercury contactor 60.

The other electrode of the contactor 60 is connected through a flexible lead 61 to one terminal of an electrical heating element 62 that is provided for actuating a bimetallic or other thermostatic element 63 for controlling the operation of the switch 60. The other terminal of the heating element 62 has connected thereto one extremity of each of two conductors 64 and 65 which respectively extend to one terminal of each of two magnet coils 66 and 67. As shown, the conductors 64 and 65 pass through a perforation 68 in the mounting base 24 at a point adjacent the extremities of these conductors which are connected to the heating element 62, and thence extend along the back of the base 24 to the points at which they are connected with the coils 66 and 67, although, of course, this particular arrangement of conductors is utilized for convenience only and is not material to the invention.

The base 24 is preferably apertured, as at 69 and 70, and portions of the coils 66 and 67 extend through these apertures to the rear of the base 24, as best shown in Fig. 5, the two coils being rigidly supported with respect to the base 24 by angular bracket members 71 and 72, respectively. These two bracket members are removably attached to the base 24 by means of screws 73 and 74, respectively, one of the latter screws also serving to secure a bracket member 75 to the base 24. The bracket member 75 extends over the front of the condenser 40 and secures this condenser against the front face of the rear plate 21 and the left-hand edge of the base 24, thus providing a secure mounting for said condenser.

The other terminal of the magnet coil 66 is connected through a conductor 76 on the back of the mounting base 24 to a point of connection with a metalic insert terminal (not shown), to the forward extremity of which a flexible conducting lead 77 is connected by means of a screw 78. This flexible lead 77 extends to one of the outside terminals of a four-electrode mercury contactor 79, the two inside terminals of which are connected in common through a flexible conducting lead 80, a connecting screw 81, another metallic insert terminal extending through the base 24 and a conductor 82 extend along the back of the base 24 to the other terminal of the magnet coil 67. This common connection of the two inside terminals of the contactor 79 constitutes this contactor a single-pole double-throw switch comprising two pairs of electrodes 79a and 79b, the function of which will appear hereinafter. The other outside terminal of this switch, which is associated with the outside one of the pair of electrodes 79b, is connected through a flexible conducting lead 83 to the terminal 30, and this pair of electrodes 79b has connected in parallel relation thereto the two electrodes of another mercury contactor 84, the container tube of which is of curved or "humped" formation, as shown.

Thus it will be seen that the terminals 30 and 31 are disposed in the secondary circuit of the transformer 53 and in circuit with the magnet coils 66 and 67. These two terminals are adapted to have connected therebetween certain external controlling apparatus of the system which may suitably consist of a room thermostatic switch and a so-called "boiler control" device including a switch that is opened and closed in accordance with a condition of the furnace or boiler, as is well understood in the art.

The various elements of the apparatus shown in Figs. 1 and 2 have been generally described above, and the details of construction and assembly of these elements will now be described.

The mercury contactors or switches 43 and 84 are carried by clips or holders 85 and 86, respectively, and these clips are respectively secured to downwardly and upwardly extending arms of a member 87 that is centrally perforated to permit the extension of an actuating rod 88 therethrough. The central portion of the member 87 is cup-shaped to receive the forward extremity of a compression spring 89, the rear extremity of which is received by a cupped member 90. The flanges or the lips of the cupped member 90 are forwardly presented and the substantially flat base portion of this member abuts against the similar portion of another cupped member 91, the lips or flange portions of which are rearwardly presented. The two cupped members 90 and 91 are rigidly secured to the actuating rod 88 by means of nuts 92, the forward end portion of the rod 88 being screw-threaded to receive these nuts. A frictional washer 93 is preferably disposed between the forward extremity of the spring 89 and the inner surface of the cup-shaped portion of the member 87, and a similar washer 94 is disposed between the rear extremity of the spring 89 and the inner surface of the cupped member 90, to provide a frictional slip connection between the rod 88 and the member 87.

The aperture in the member 87, through which the rod 88 extends, is of sufficient size to permit free rotation of the rod 88 therein. The member 87 is maintained in position longitudinally of the rod 88 by means of a positioning nut 95 and a cooperating lock nut 96. The structural details of the frictional slip connection thus constituted are disclosed and claimed in copending application Serial No. 212,365, filed August 12, 1927, by Louis A. M. Phelan, and assigned to the assignee of the present application, and accordingly these structural details are not claimed herein.

A similar frictional slip connection is provided between the rod 88 and a member 97, to which the container tube for the mercury contactor 79 is secured by means of a clip or holder 98. The latter frictional slip connection is constituted by the cupped member 91, a compression spring 99 disposed between said cupped member 91 and a cupped portion of the member 97, and friction washers 100 and 101 disposed between the respective extremities of the spring 99 and the cup shaped members which receive the extremities of the spring. The member 97 is maintained in position longitudinally of the rod 88 by a positioning nut 102.

A collar member 103 is rigidly secured to the rear casing wall 21 in any suitable manner, as by welding or swaging, the wall 21 being suitably apertured for this purpose. A sleeve member 104 extends within the collar member 103 in relatively close-fitting relation thereto and is fixed in position with respect thereto by a set-screw 105. The rear extremity of the sleeve 104 receives the foremost portion of a coiled bimetallic or other thermostatic element 106, and the end of the element 106 is secured to the sleeve 104 by means of a screw 107. From this point the thermostatic element 106 extends rearwardly for a substantial distance whereby this exposed portion of the element may be disposed within the stack or flue of the furnace to render said element responsive to conditions of combustion in the furnace.

The rod 88 extends rearwardly throughout the entire length of the sleeve 104 and the thermostatic element 106 in axial relation to these members and is angularly bent at its rearmost extremity. This angularly bent portion of the rod 88 extends through a hole in the rearward extremity of the thermostatic member 106 and is screw-threaded to receive nuts 108 and 109 for firmly securing the rod 88 to the end of the thermostatic element 106. An angular bracket member 110 is secured within the forward extremity of the sleeve 104 by means of a screw 111 and the upstanding portion of this bracket member is apertured to form a supporting journal for the rod 88 at this point. Immediately behind the bracket 110 a collar member 112 is secured to the rod 88 by means of a set-screw 113, this collar member thus cooperating with the nut 102 to prevent any substantial longitudinal displacement of the rod 88.

It will be understood that when the thermostatic element 106 is subjected to varying temperatures due to different conditions of combustion within the furnace or combustion chamber to be controlled by the system disclosed, the rearward extremity of this thermostatic member is rotated by reason of the expansion and contraction of its coils. This rotation is transmitted directly to the rod 88 and thus to a limited extent to the members 87 and 97 which support the mercury contactors or switches 43 and 84, and 79. The limitation of movement of the members 87 and 97 is permitted by reason of the frictional slip connections between these members and the rod 88, as above described. These limitations are definitely effected by stop members 114, 115 and 116, which are adapted to be engaged by the members 87 and 97 in different positions thereof.

The stop member 114 is constituted by an angularly bent metallic member having a foot portion 117 located within a segmental depression 118 in the front face of the mounting base 24, and adjustably positioned by means of a securing screw 119. The forward extremity of this stop member 114 is disposed in the path of movement of the upper extremity of the member 87, and thus serves to limit the counterclockwise rotation of this member, as viewed in Fig. 1.

The stop member 115 is constituted by a projection of insulating material on the front face of the mounting base 24, which projection may be either integrally or separately formed with respect to the base 24. This projection is located in the path of movement of the member 97 and serves to limit the counterclockwise rotation of this member, as viewed in Fig. 1.

The stop member 116 comprises an elongated foot portion 120 having a longitudinally extending slot 121 therein and located within a substantially rectangular depression 122 in the front surface of the mounting base 24. A screw 123 extends through the slot 121 and is adapted to secure the stop member 116 in any desired position of adjustment within the limits determined by the depression 122. The upstanding portion of the stop member 116 is stepped to form an edge 124 located in the path of movement of the member 97 to limit the clockwise rotation thereof, as viewed in Fig. 1, and an edge 125 located in the path of movement of the member 87 to limit the similar movement of this latter member. The construction of the member 116 is shown in detail in Fig. 3ª.

With the above described construction and arrangement of the stop members 114, 115 and 116, it will be seen that the extreme counterclockwise position of the member 87 is adjustable within the limits determined by the extreme position of the foot portion 117 of the stop member 114 in the segmental depression 118 in the front surface of the base 24; the extreme counterclockwise position of the member 97 is definitely limited by the fixed stop 115; and the extreme clockwise positions of the members 87 and 97 are fixed with respect to each other by the edges 124 and 125 of the stop member 116, but co-incidentally adjustable by the adjustable setting of the foot portion 120 of the stop member 116 along the rectangular depression 122 in the front surface of the base member 24.

The thermostatic element 106 is so arranged that the rod 88 is rotated in a clockwise direction, as viewed in Fig. 1, as this thermostatic member is heated. Cooling of the member 106 thus obviously effects counterclockwise rotation of the rod 88, as viewed in the same figure. While the member 106 is relatively cool, therefore, which condition corresponds to an absence of combustion in the furnace or combustion chamber that is to be controlled by the system, the members 87 and 97 are in their extreme counterclockwise positions, as shown in Figs. 1 and 2. When these members occupy such positions, the container for each of the mercury contactors 43, 84 and 79 is tilted downwardly to the left, as shown. Each of the contactors 43 and 84 comprises a single pair of electrodes located in the left-hand extremities of the respective containers and, therefore, both of these switches are closed in the positions described.

The contactor 79 comprises the pair of electrodes 79a connected between the conductors 77 and 80 and located in the left-hand extremity of the container for this conductor, and the pair of electrodes 79b connected between the conductors 80 and 83 and located in the right-hand extremity of the container, as previously described. Thus, in the position of the switch 79 corresponding to a relatively cold condition of the thermostatic element 106, the switch 79 is effective to establish a connection between the conductors 77 and 80 and to interrupt the circuit between the conductors 80 and 83.

As the temperature of the thermostatic element 106 is raised due to the establishment of combustion in the furnace or combustion chamber to be controlled, the rod 88 is gradually rotated in a clockwise direction, as viewed in Fig. 1. After a predetermined extent of such rotation, the switch 79 is tilted to such an extent that the body of mercury therein is caused to flow from the left-hand extremity of its container to the right-hand extremity thereof, thus interrupting the circuit connection between the conductors 77 and 80 and completing the connection between the conductors 80 and 83. This action precedes that of the switches 43 and 84 because the angle of inclination of the container for the switch 79 in a direction downward and to the left as viewed in Fig. 1, is less in the extreme counterclockwise position of the switches than is the angle of inclination of the switches 43 and 84. As the rotation of the rod 88 continues, the switch 43 is tilted to such an extent that the body of mercury within its container is moved from the left-hand extremity of said container to the right-hand extremity thereof to interrupt the circuit connection between the conductors 44 and 45, which are respectively connected to the two electrodes located in the left-hand extremity of the container for the switch 43. The opening of the circuit between the electrodes of the switch 43 interrupts the ignition circuit of the burner control system, as will hereinafter appear in connection with the description of the entire system of circuit connections.

The final action effected by the clockwise rotation of the rod 88 in response to the rising temperature of the thermostatic element 106 is the opening of the circuit between the two electrodes of the switch 84, which electrodes are connected in parallel relation to the two electrodes 79b at the right-hand extremity of the switch 79, to which latter electrodes the conductors 80 and 83 are respectively connected. The opening of the switch 84 is brought about subsequently to the operation of the switches 79 and 43 by reason of the curved or humped formation of the container for the switch 84.

Shortly after the switch 79 is operated in the manner above described, the member 97, which supports said switch, engages the edge 124 of the adjustable stop 116 whereby further movement of the member 97 is prevented. In like manner the movement of the member 87 is arrested by engagement of the upper portion of this member with the edge 125 of the stop member 116 shortly after the switch 84 is opened in the manner above described. When the two members 87 and 97 have been thus actuated to their extreme clockwise positions, further movement of the thermostatic member 106 in response to a further increase in the temperature of said thermostatic member is ineffective to cause any further movement of the switches carried by the members 87 and 97, and it is during this condition that the frictional slip connections between the rod 88 and the members 87 and 97 are effective. Upon cooling of the thermostatic member 106, however, the direction of rotation of the rod 88 is immediately reversed and immediate actuation of the members 87 and 97 toward their original positions, as shown in Figs. 1 and 3, is initiated. The switches 79, 43 and 84 are thereupon returned to their original conditions in the same sequence of operation that these switches were first actuated, as above set forth, that is, the switch 79 is first actuated to cause the circuit between the conductors 80 and 83 to be broken and the circuit between the conductors 77 and 80 to be reestablished; the switch 43 is next reclosed; and the switch 84 is finally reclosed; the operation of the last mentioned switch being delayed beyond all of the others because of the curved or humped formation of its container. The reasons for providing this sequence of operation of the switches 79, 43 and 84 and the results effected by the operation of these switches will appear hereinafter.

Reference is now had to Figs. 4 and 5, in conjunction with Fig. 1, for a more complete description of the construction and relation of the switch 36 and the magnet coils 66 and 67. The manner of mounting the magnet coils 66 and 67 by means of the angular bracket members 71 and 72, as illustrated, has been described. It will now be seen that the magnet coil 66 constitutes a solenoid coil, while the coil 67 is provided with a fixed magnetic core member 126. An armature member 127 extends through a transverse groove or slot in a spindle 128 and is secured thereto by means of a pin or rivet 128a. A reduced-diameter portion of the spindle 128 extends through a hole in the mounting base 24, which is thickened or provided with a transversely extending tubular portion or member 24a at this point to provide a rigid journal for said spindle. It will be observed that this pivotal mounting for the armature member 127 is located substantially on the vertical center line of the coils 66 and 67 and substantially midway between the two coils. The central portion of the armature member 127 extends substantially horizontally, as shown, when this armature is in its normal position corresponding to the deenergized condition of both of the magnet coils 66 and 67. A portion 129 of the armature member 127 extends upwardly and somewhat to the left from the left-hand extremity of the horizontal central portion of said armature member, and the extremity of this upwardly extending portion is again bent to form a portion 130 extending to the right and somewhat upwardly to a position within the solenoid coil 66.

With this construction, energization of the coil 66 will cause the portion 130 of the armature member 127 to be actuated to the right, the armature member of course being made of magnetizable material. Such movement of the portion 130 of the armature member 127 causes the whole armature member and the spindle 128 to be moved pivotally in the journal 24a, through which said spindle extends. When the armature is actuated in this manner, the lower extremity of a portion 131 of said armature, which extends downwardly from the right-hand extremity of the horizontal central portion, is moved into engagement with or proximity to the right-hand extremity of the fixed core member 126 of the magnet coil 67. This right-hand extremity of the fixed core member 126 is preferably enlarged, as shown at 132, and the lower extremity of the armature portion 131 is similarly enlarged, as shown at 133, to provide a larger cross-sectional area for the magnetic flux linking the two members.

A brass pin 134 is also preferably provided in the armature portion 131 to engage the end of the enlarged portion 132 of the fixed core member 126 to prevent chattering and sticking of the armature in its actuated position. The air gap between the fixed core member 126 and the armature portion 131, before the armature is actuated by the coil 66, is so large that energization of the coil 67 will not effect actuation of the armature member, but when this member has been actuated in response to energization of the solenoid coil 66, the coil 67 will maintain the armature member in its actuated position independently of the energization of the coil 66. By reason of this relation of the two coils to the armature member, the coil 66 is designated as the "pull" coil and the coil 67 is designated as the "hold" coil. The manner in which the two coils are energized will appear hereinafter.

For the purpose of biasing the armature 127 and the spindle 128 toward the position indicated in the drawings, a substantially triangular weight 135 is secured to the rear extremity of the spindle 128 between the rear casing wall 21 and the mounting base 24, by means of a screw 136. The forward extremity of the spindle 128 has secured thereto, by means of a pin or rivet 137, a clip or holder 138 which embraces the container of the mercury contactor switch 36 so that this switch is tilted in accordance with the pivotal movement of the armature member 127. As shown in the drawings, the two electrodes of the switch 36 are located near the right-hand extremity of the container so that the switch is open when the parts occupy the positions shown, which correspond to the deenergized condition of the magnet coils 66 and 67. Upon energization of the solenoid coil 66, the resultant pivotal movement of the armature member 127 causes the switch 36 to be tilted in the direction opposite to that shown, so that this switch is closed. Thereafter the switch will be maintained closed as long as the hold coil 67 is maintained in an energized condition. Upon deenergization of the hold coil, the switch 36 is returned to its open position by reason of the biasing effect of the weight 135.

The structural details of the mounting and actuating mechanism for the mercury contactor 60 are not a part of the present invention, but these details will be described briefly in order that a complete understanding of the entire assembly of the apparatus may be had. For a more complete understanding of the details of this particular part of the apparatus, reference may be had to copending application Serial No. 337,334, filed February 4, 1929, by Lawrence E. Koch, and assigned to the assignee of the present application.

The container tube of the switch 60 is embraced by a clip or holder 139 that is secured to a pivotally mounted member 140. The latter member is journaled upon a pin or rod 141 carried by the right-hand extremity of a metallic strip 142 extending substantially horizontally along the front face of the mounting base 24. The strip 142 is pivotally adjustable about a screw 143, which extends through a suitable hole in said strip and engages a screw-threaded opening or insert in the mounting base 24. The left-hand extremity of the strip 142 is perforated to accommodate a screw 144, the head of which is located in a suitable depression or cavity in the front face of the mounting base 24 behind a bracket member 145 that is slotted at 146, also for the purpose of accommodating the screw 144. The bracket member 145 is preferably also seated in a cavity in the front face of the mounting base 24 and is suitably secured in position by screws 147. A slotted nut and handle member 148 engages the forward extremity of the screw 144 to secure the left-hand extremity of the member 142 in its adjusted position.

The pivotally mounted member 140 comprises a portion 149 extending downwardly at the right-hand extremity thereof. The lower end of the downwardly extending portion 149 extends through an aperture in the bimetallic member 63, near the right-hand extremity thereof, and in this manner the pivotally mounted member 140 and the switch 60 that is carried thereby are normally maintained in the position indicated in the drawings, in which the container tube of the switch 60 is tilted downwardly to the right. The two electrodes of the switch 60 being located near the right-hand end of the container, it will be seen that this switch is closed when it occupies the said normal position. Upon a predetermined downward deflection of the bimetallic member 63, however, the right-hand extremity of this bimetallic member disengages the lower extremity of the portion 149 of the pivotally mounted member 140, whereupon the action of gravity upon the switch 60 and member 140 causes these parts to move pivotally about the rod or pin 141 in a counterclockwise direction, as viewed in Fig. 1. Such movement causes the switch 60 to be tilted downwardly to the left, whereby the mercury within the container is moved to the left-hand extremity of the container to open the circuit through the two electrodes of this switch.

The downward deflection of the bimetallic member 63 is effected by an increase in the temperature thereof in response to energization of the electrical heating element 62 in a manner which will appear hereinafter. For the purpose of rendering this part of the apparatus independent of ambient temperatures, the bimetallic member 63 is supported by means of screws 150, spacing members or collars 151, and nuts 152, at the right-hand extremity of a second bimetallic element 153. The latter bimetallic element is rigidly secured upon a forwardly extending portion 154 of the bracket member 145 by means of screws 155 and cooperating nuts 156. The bimetallic member 153 operates in a manner opposite to that in which the member 63 operates, that is, the right-hand extremity of the member 153 is deflected upwardly in response to a rise in temperature. The two bimetallic elements 63 and 153 are so proportioned that the deflections effected by changes in ambient temperature will exactly balance one another and will have no effect whatever upon the absolute position of the right-hand extremity of the bimetallic member 63. The heating element 62, however, is so disposed as to affect the bimetallic member 63 without affecting the member 153, so that the desired operation of the device is effected.

The right-hand extremity of the bimetallic member 63 is inclined downwardly, as shown, so that after this member has been deflected downwardly to such a position that the portion 149 of the pivotally mounted member 140 is disengaged to permit this pivotally mounted member to be actuated by gravity in such manner that the switch 60 is opened, the member 140 and the switch 60 may be restored to their normal positions by manual depression of a handle lever 157. This handle lever is secured to the downwardly extending portion 149 of the pivotally mounted member 140 and extends to the right a short distance beyond the right-hand edge of the rear casing wall 21. It will be understood that the cover for the casing will be slotted or otherwise apertured to accommodate free movement of the handle member 157 in the actuation of the switch 60. After the pivotally mounted member 140 has been released in response to a predetermined heating of the bimetallic member 63 and the latter member has cooled sufficiently to return to its normal position, the manual depression of the handle lever 157 will cause the downwardly inclined right-hand extremity of said bimetallic member to be depressed and to ride over the lower extremity of the portion 149 of the pivotally mounted member 140 until said lower extremity comes into alignment with the cooperating slot or aperture in the member 63. This deflection is permitted by reason of the resilient character of the member 63, and the resilience of this member also causes it to be returned to its normal position, as shown, after such temporary deflection during manual resetting of the member 140, when the lower extremity of the portion 149 is brought into alignment with the aperture in the right-hand extremity of the bimetallic member 63.

It will now appear that a change in the setting of the left-hand extremity of the metallic strip 142, which may be effected by loosening the securing nut and handle member 148 and utilizing said member 148 as a handle to move the said extremity of said strip manually, will cause the supporting pivot 141 for the member 140 to be moved upwardly or downwardly a short distance about the screw 143 as a pivot. During such movement the securing screw 144 moves freely through the slot 146 in the bracket member 145, and the head of this screw likewise moves freely through the suitable cavity provided therefor in the front face of the mounting base 24 behind the inset portion of the bracket member 145. Such adjustment of the pivot 141 causes the downwardly extending portion 149 of the pivotally mounted member 140 to be overlapped less or greater amounts by the right-hand extremity of the bimetallic member 63, and a correspondingly less or greater deflection of said bimetallic member is required before said member is caused to release the pivotally mounted supporting member 140 for the switch 60.

Reference is now had to Figs. 6 and 7 to illustrate the preferred manner of installing the apparatus above described. In these figures the reference character 158 designates the floor of the basement or other room where the heating and control apparatus is to be installed, and the motor or other actuating mechanism and the ignition mechanism for such apparatus are inclusively indicated at 159. A current supply circuit is brought in through conduit sections 160 and 161 to a service supply switch 162, thence back through the conduit section 161 and another conduit section 163 to an elbow or other suitable fitting 164 that is secured to the overhead construction 165 of the basement or other room. From the fitting 164 a vertical conduit section 166 extends downwardly to connect with the casing for the apparatus heretofore described which is now identified generally by the reference character 167. This apparatus is located adjacent a portion 168 of the stack or flue for the furnace to be controlled, and the coiled thermostatic element 106 extends through a suitable aperture in one wall of this flue or stack portion to be exposed to the products of combustion to be conducted away from the furnace or combustion chamber. A flanged member 169 is secured to the wall of the stack or flue around the aperture through which the thermostatic element 106 is inserted, and a collar portion 170 of said flanged member 169, which fits closely around the projecting sleeve 104, is provided with a set screw 171 for securing the sleeve 104 rigidly to said flanged member. From the bottom of the apparatus 167 another vertical conduit section 172 extends downwardly to a fitting 173 that is supported a slight distance above the floor 158, as shown. From the fitting 173 another conduit section 174 extends horizontally to the actuating mechanism 158. Thus, the apparatus designated generally as 167 is rigidly supported with respect to the stack or flue 168 by the conduit sections 166 and 172 as well as by the stack or flue itself.

The very simple installation above described includes all of the controlling apparatus normally required for a heating system of the character contemplated, with the exception of a room thermostatic switch and a boiler control device of the type heretofore mentioned. These devices are normally connected in series relation to each other and are adapted to be electrically connected to the apparatus 167 through a flexible or other conduit 175, which may suitably extend to the apparatus 167 through an insulated bushing 176 extending through a suitable aperture in the top casing portion 22, as shown in Fig. 1. This top casing portion 22 and the bottom casing portion 150

23 are also suitably apertured, as indicated at 177 and 178, respectively, to accommodate the connection of the conduit sections 166 and 172 to these portions of the casing by means of suitable connecting fittings 179 and 180, respectively, as shown in Fig. 7, and to accommodate the conductors extending through said conduit sections to the apparatus in the casing.

Figs. 8 and 9 show a partial modification of the invention in which the clip or holder 85, which carries the ignition switch 43, is rigidly secured to the forward extremity of the rod 88 by means of the nuts 95 and 96 and another nut 181. The mercury switch 84 of the apparatus heretofore described is replaced by a pair of exposed contacts 182 and 183, the former of which is carried by a fixed support 184 which may be connected to the conductor 82 by means of a conductor 185. The contact 183 is carried at the upper extremity of a vertically extending resilient conducting member 186, the lower extremity of which is fixed to the forward extremity of the rod 88 to be actuated thereby in the same manner that the mercury contactor ignition switch 43 is actuated. An electrical circuit connection is made to the contact 183 by means of a conductor 187 joining the conductor 83 and a metallic arm 188, the latter being disposed in electrical conducting relation to the resilient contact carrying arm 186. Thus, the contacts 182 and 183 may be connected in circuit between the conductors 82 and 83 by means of the conductors 185 and 187 in the same manner that the switch 84 is connected between the conductors 82 and 83, as previously described. The four-electrode mercury contactor switch 79 of the previously described embodiment of the invention is now replaced by two pairs of exposed contacts 189 and 190, and 191 and 192. The contact 189 is carried at the lower extremity of a resilient conducting member 193, the contact 190 is carried in proximity to the contact 189 by a resilient conducting member 194, the lower portion of which is of substantially U-formation, the contact 191 is carried at the lower extremity of a resilient conducting member 195, and the contact 192 is carried in proximity to the contact member 191 at the extremity of the U-shaped portion of the resilient conducting member 194. The three resilient conducting members 193, 194 and 195 are supported at their upper extremities, in electrically insulated relation, by separating members 196 and 197, and a securing screw 198 and cooperating nut 199.

The resilient conducting member 193 is so biased that the contact 189 tends to remain out of engagement with the contact 190, and the member 194 is so biased that the contacts 191 and 192 tend to remain in engagement, as shown. The member 193, however, is adapted to be engaged near its lower extremity by an insulating member 200 that is carried near the lower extremity of the metallic arm 188 when the latter arm is rotated in a clockwise direction, as viewed in Fig. 8. When the member 193 is thus engaged, the lower extremity thereof is actuated to the left to cause the contact 189 to engage the contact 190. Further clockwise rotation of the arm 188 effects a movement to the left of the lower extremities of both of the members 193 and 194, so that the contact 192 is actuated out of engagement with the contact 191, while the contacts 189 and 190 remain in engagement with each other. Since the contacts 191 and 192 are respectively connected to the conductors 76 and 82, and the contacts 189 and 190 are respectively connected to the conductors 83 and 82, as shown, it will be seen that the former pair of contacts corresponds to the electrodes 79a of the switch 79 and the latter pair of contacts corresponds to the electrodes 79b of the switch 79 of the previously described embodiment of the invention.

The metallic arm 188 is adapted to be actuated by the rod 88 in a manner similar to that in which the arm 97 is so actuated in the previously described embodiment, that is, by a frictional slip connection comprising a cupped member 201 secured to the back surface of the arm 188, a cupped washer 202 secured to the rod 88 between the nut 102 and a cooperating nut 203, and a compression spring 204 disposed between the cupped members 201 and 202, and operating upon said cupped members through friction washers 205 and 206, respectively. Thus the arm 188 may be rotated a sufficient distance to control the engagement of the contact members 189, 190, 191 and 192 in the manner heretofore described, but the movement of the arm 188 may be arrested after such movement independently of the rotation of the rod 88. This arrest in the movement of the arm 188 may be effected by the increasing retarding effect of the resilient contact carrying members 193 and 194, or by a stop member 188a disposed to be engaged by the arm 188, as desired. Upon reversal in the direction of rotation of the rod 88 in response to a change in the conditions of combustion in the system to be controlled, the movement of the arm 188 in a direction opposite to that of its last movement is immediately effected because of the immediate effectiveness of the frictional slip connection between the arm 188 and rod 88, and after the contacts 189, 190, 191 and 192 and the arm 188 have returned to their original positions, further movement of said arm may be prevented by a stop 188b.

It will be understood that insofar as common reference characters have been used in connection with this embodiment of the invention and that previously described, the parts thus designated are the same in both embodiments, the different reference characters being utilized only to indicate different details of structure or arrangement.

Another partially modified embodiment of the invention is illustrated in Figs. 10 and 11, in which the holder 85 for the ignition switch 43 is again rigidly secured to the forward extremity of the rod 88 by means of the nuts 95 and 96 and cooperating nuts 207 and 208, which also serve to secure rigidly to the rod 88 a contact actuating arm 209. The latter arm is utilized in place of the resilient contact carrying arm 186 in the embodiment of the invention illustrated in Figs. 8 and 9, and in place of the mercury contactor switch 84 of the embodiment first described in connection with Figs. 1, 2 and 3. The arm 209 does not directly carry a contact member but rather is provided with an engaging portion 210 which is preferably of insulating material and which is adapted to engage a resilient conducting member 211 carrying a contact 212 at its outer extremity. The contact 212 cooperates with a contact 213 carried at the outer extremity of another resilient conducting member 214. When the rod 88 is in the position corresponding to a relatively cold condition of the stack thermostatic member 106, the rod 209 causes the member 210 to bear against the resilient conducting member 211 to maintain the contact member 212 that is carried thereby in engagement with the contact 213, as shown in Fig. 10. Upon movement of the rod 88 in response to the heating of the thermostatic member 106, however, the arm 209 is rotated in a clockwise direction, as viewed in Fig. 10, to cause the engaging member 210 to disengage the member 211, the resilience of which thereupon causes the contact 212 to disengage the contact 213, this operation corresponding to the disengagement of the contact 182 by the contact 183 under similar conditions in the partial embodiment of the invention illustrated in Figs. 8 and 9.

As shown in Figs. 10 and 11, a cam member 215 is eccentrically mounted upon the shaft 88 and is provided with a frictional slip connection with said shaft by means of a cupped member 216 secured to said cam, a cupped member 217 secured to the rod 88 by means of nuts 218 and 219, and a compression spring 220 co-acting between said cupped members through the agency of frictional washers 221 and 222, respectively. The cam 215 is adapted to engage a resilient conducting member 223 which carries near its forward extremity a contact 224 adapted to cooperate with a contact 225 carried in proximity thereto by another resilient conducting member 226. The forward extremity of the member 226 is of substantially U-formation and the extremity of the U-shaped portion of this member carries a contact 227 adapted to cooperate with a contact 228 carried at the outer extremity of a member 229. The contact carrying members 223 and 226 are so biased that the contacts 224 and 225 tend to remain out of engagement with each other, while the contacts 227 and 228 tend to remain in engagement with each other.

Upon rotation of the cam 215 by the rod 88, through the agency of the frictional slip connection as described, the periphery of this cam engages the upper surface of the resilient member 223 and actuates the forward extremity of this member downwardly to cause the contact 224 to engage the contact 225. Further rotation of the cam 215 in a clockwise direction, as viewed in Fig. 10, causes both of the contact carrying members 223 and 226 to be actuated downwardly at their outer extremities, which results in the contact 227 being moved out of engagement with the contact 228 while the contacts 224 and 225 remain in engagement with each other.

In order to support the members 223, 226 and 229 and to permit such actuation thereof, and also to support the contact carrying members 211 and 214, an angular bracket member 230 is preferably secured to the mounting base 24 by means of screws 231 and cooperating nuts 232 and the several contact carrying members are supported upon this angular bracket member by means of insulating and separating members 233, 234, 235, 236 and 237 and a securing screw 238 and cooperating nut 239. In the arrangement shown in the drawings, the contact carrying members 214 and 229 are supported in electrical conducting relation to each other to facilitate the making of desired circuit connections between the different sets of contacts. This connection is slightly different from those found in the embodiments of the invention previously described, but is in accordance with one of the embodiments of circuit connections as described hereinafter.

The cam 215 is illustrated as having a radially projecting stop member 240 secured to the periphery thereof to cooperate with fixed stops 241 and 242 that are suitably secured to the mounting base 24. These three stop members cooperate to limit the rotation of the cam 215, which rotation may be arrested independently of the rotation of the actuating rod 88 because of the frictional slip connection that is utilized between the rod 88 and the cam 215, as above described. When the cam 215 has been actuated a sufficient distance to effect engagement between the contacts 224 and 225 and thereafter to effect disengagement of the contacts 227 and 228, the rotation of said cam is arrested by engagement of the stop 240 with the stop 242, and further rotation of said rod 88 in the same direction has no affect upon the cam. A reversal in the direction of rotation of the rod 88, however, will effect an immediate reversed rotation of the cam 215 to effect reengagement between the contacts 227 and 228 and subsequent disengagement of the contacts 224 and 225 in a relatively short interval of time, whereafter the reversed rotation of the cam 215 is arrested by engagement of the stop 240 with the stop 241. Since the switch 43 and the actuating arm 209 for the contacts 212 and 213 are rigidly secured to the rod 88, said switch and contacts are not returned to their original conditions until the rod 88 has returned throughout its full path of travel to the position corresponding to the relatively cold condition of the stack thermostatic member 106.

A still further partially modified embodiment of the invention is illustrated in Figs. 12 and 13, in which the rod 88 is illustrated as having a cam 243 rigidly secured thereto near its forward extremity by means of the nuts 95 and 96 and a cooperating nut 244. Another cam is carried in slip frictional engagement with the rod 88 in the same manner and for the same purpose that the cam 215 is so carried in the partial embodiment of the invention illustrated in Figs. 10 and 11, and therefore this cam is also designated by the reference character 215 and the various parts of the actuating mechanism therefor are identified by the same reference characters that are applied to the corresponding parts in Figs. 10 and 11, and no further description of these parts at this point is necessary.

Exposed contact members 224, 225, 227 and 228 are carried by resilient conducting members 223, 226 and 229 in the same manner that the contacts identified by the same reference characters are carried in the apparatus shown in Figs. 10 and 11, and these contacts are adapted to be actuated by the cam 215 in the same manner as that described with respect to said figures. The only difference between the apparatus disclosed in Figs. 10 and 11 and that disclosed in Figs. 12 and 13 in respect to these parts is that the contact carrying members 223, 226 and 229 are located at one side of the cam 215 in the latter two figures, instead of directly below this cam as illustrated in the former two figures. This change in the mounting of these contact carrying members simply involves a different location of the supporting bracket 230 upon the mounting base 24, as will clearly appear from an inspection of the drawings.

The distinguishing features of the apparatus disclosed in Figs. 12 and 13 lie in the manner of operating the ignition switch 43 and a pair of exposed contacts 245 and 246 which correspond to the contacts 212 and 213 of the apparatus shown in Figs. 10 and 11. The clip or holder 85 for the ignition switch 43 is secured to an arm 247 at an intermediate point thereof, said arm being pivotally mounted upon a screw 248 that is supported at the forward extremity of an angularly bent bracket member 249. The base of this bracket member 249 is secured to the mounting base 24 by means of screws 250 and cooperating nuts 251. The pivoted arm 247 extends to the left from its pivotal support 248 a substantial distance beyond the point at which the holder 85 of the ignition switch 43 is secured thereto and the left-hand extremity of this arm rests by gravity upon the upper peripheral portion of the cam 243. Since this cam is rigidly secured to the rod 88, as described, its position bears a definite and fixed relation to the temperature of the thermostatic element 106. When said thermostatic member is relatively cold, the cam 243 occupies the position substantially as shown in the drawings, in which the left-hand extremity of the arm 247 is lower than the pivotal support 248 of said arm, whereby the container tube of the ignition switch 43 is tilted downwardly to the left, as shown. The electrodes of the switch 43 being located near the left-hand extremity of the container, the switch is closed when it is tilted in this direction. Upon rotation of the cam 243 in a clockwise direction, as viewed in Fig. 12, the left-hand extremity of the arm 247 is raised so that after a predetermined degree of such rotation, the switch 43 is tilted in the opposite direction and thus caused to interrupt the circuit between its electrodes by reason of the flow of mercury to the right-hand end of the container.

The cam 243 also serves to actuate the contacts 245 and 246, which are respectively carried by resilient conducting members 252 and 253. The conducting member 252 is shown as being supported by the screw 238 and the several separating and insulating members in electrical conducting relation to the contact carrying member 229, in a manner corresponding to that in which the contact carrying member 214 is supported in the apparatus shown in Figs. 10 and 11. The forward extremity of the member 252 is bent to form a portion 254 extending to the right to a point close to the periphery of the cam 243, and is then again bent to form a rearwardly extending portion 255 that is adapted to be engaged by said cam. The member 252 is so biased that when it occupies its free position, the contact 245 is out of engagement with the contact 246, but said member 252 is sufficiently resilient to permit deflection thereof to effect engagement between the contacts 245 and 246 when the rearwardly extending portion 255 is engaged by the cam 243. In the illustrated position of the cam 243 the rearwardly extending portion 255 of the member 252 is sufficiently deflected to the left to effect engagement of the contacts 245 and 246 as stated, this condition corresponding to the relatively cold condition of the thermostatic member 106. Upon heating of this thermostatic member the cam 243 is rotated in a clockwise direction, as viewed in Fig. 12, and after a predetermined degree of such rotation the portion 255 of the member 252 is permitted to move to the right a sufficient distance to effect disengagement of the contacts 245 and 246, which contacts then remain out of engagement until the thermostatic member 106 is again cooled to such an extent that the cam 243 is returned to substantially its original position, which also results in the reclosing of the ignition switch 43.

In the description of the two systems of circuit connections illustrated diagrammatically in Figs. 14 and 15, which description will appear presently, the previously used reference characters are those applied to the apparatus shown in Figs. 1 to 7, inclusive, but it will be understood that these systems of circuit connections may be utilized in conjunction with any of the several structural embodiments of the invention herein disclosed. For the purpose of maintaining a clear understanding of the relation between the different parts of the apparatus shown in the several partial modifications, it is considered advisable to designate the different switches and contacts by terms which are equally applicable to the different forms, and, accordingly, the switch 43, which is illustrated as a mercury contactor in all of the embodiments, is generally designated as the "ignition switch." The switch 84, shown in Figs. 1 and 2, is designated as the "recycling switch" and its equivalent is found in the contacts 182 and 183 in Figs. 8 and 9, the contacts 212 and 213 in Figs. 10 and 11, and the contacts 245 and 246 in Figs. 12 and 13. The four-electrode switch 79, illustrated in Figs. 1, 2 and 3, is designated as the "stack switch", the electrodes 79a thereof are designated as the "cold" contacts and the electrodes 79b are designated as the "hot" contacts, because the circuits between these two pairs of electrodes are respectively closed when the stack thermostatic element 106 is relatively cold and relatively hot. The equivalent of the electrodes 79a is found as the contacts 191 and 192 in Figs. 8 and 9, and the contacts 227 and 228 in Figs. 10, 11, 12 and 13. The equivalent of the electrodes 79b is found as the contacts 189 and 190 in Figs. 8 and 9, and the contacts 224 and 225 in Figs. 10, 11, 12, and 13. Having thus pointed out the correspondence between the different parts of the apparatus shown in the several previous figures of the drawings, the manner of connecting any of the various structural embodiments of the invention in the electrical circuit systems illustrated in Figs. 14 and 15 will be apparent from a consideration of the following description, in which, as above stated, only the reference characters used in Figs. 1 to 5, inclusive, are utilized to indicate such parts.

Referring first to Fig. 14, two current supply conductors 256 and 257 are shown, it being understood that these conductors will be respectively connected to the line terminals 28 and 29 of the controlling apparatus, as heretofore stated in reference to Fig. 1. A motor or other burner actuating apparatus 258, which is included in the apparatus indicated at 159 in Fig. 6, is connected in the circuit by means of conductors 259 and 260 which will be respectively connected to the motor terminals 32 and 33, as shown in Fig. 1 and described with reference thereto. Connections to an ignition device 261, also included in the apparatus 159 of Fig. 6, are made through conductors 262 and 263 which will be respectively connected to the terminals 35 and 34 of Fig. 1.

The transformer 53 is illustrated as comprising a primary winding 264 that is connected between the current supply conductors 256 and 257 by means of the conductors 51 and 52, as described in connection with Fig. 1, and a secondary winding 265, the terminals of which are connected through conductors 56 and 57 to the control circuit. It will be remembered that the terminals 30 and 31 of Fig. 1 are located in the control circuit between the conductors 56 and 83, to facilitate the connection of a room thermostatic switch and the switch of a boiler control or similar device in said circuit. In Fig. 14 the room thermostatic switch is diagrammatically indicated at 266 and the switch of the boiler control or similar device is diagrammatically indicated at 267, these two switches being connected in series relation to each other by a conductor 268. The other terminal of the room thermostatic switch 266 is connected to the conductor 83 by means of a conductor 269, and the other terminal of the switch of the boiler control or similar device is connected to the conductor 56 by means of a conductor 270. It will be understood that the conductors 269 and 270 will be brought into the casing containing the control apparatus through the insulating bushing 176 and that they will be respectively connected to the terminals 30 and 31. The remaining connections of the control circuit, as described with reference to Fig. 1, comprise a series circuit extending from the conductor 83 through the recycling switch 84 and the hot contacts 79b of the stack switch 79 in parallel relation to each other; the cold contacts 79a of the stack switch 79, conductors 77 and 76, the pull coil 66, and the conductor 64, all shunted by the conductors 80 and 82, the hold coil 67 and the conductor 65; and the electrical heating element 62, conductor 61, switch 60 and conductor 59 to the other transformer secondary terminal conductor 57.

The operation of the control system connected according to Fig. 14 is normally controlled by the room thermostatic switch 266 which is arranged in any well known manner to be responsive to the temperature of the space to be heated. A demand for heat in the space to be heated is signified by the closing of the switch 266 which effects initial energization of the control circuit, the switch 267 of the boiler control or similar device being normally closed. This control circuit extends through the recycling switch 84, the cold contacts 79a of the stack switch, which are normally closed because the stack thermostatic element 106 is relatively cold after a period of inactivity of the heating system, the pull coil 66 and hold coil 67 in parallel therewith, the electrical heating element 62, and the switch 60. The pull coil 66 and hold coil 67 are thus connected across the secondary winding 265 of the transformer 53, the primary winding 264 of which is continuously energized from the current supply conductors 256 and 257.

The energization of the pull coil 66 results in the actuation of the armature 127 to close the motor switch 36. This actuation of the armature 127 brings the lowermost portion thereof into proximity with the fixed core 126 of the hold coil 67, as will be readily understood upon reference to Fig. 4. The hold coil 67 is connected in parallel circuit relation to the pull coil 66 under the circuit conditions described, and thereafter the continued energization of the hold coil maintains the motor switch 36 in closed position throughout the period of operation of the heating system. The closure of the motor switch 36 connects the motor or other actuating apparatus 258 directly to the current supply conductors 256 and 257, whereby the operation of such motor or other actuating apparatus is immediately initiated.

The ignition device 261 is also energized at this time, because it is connected directly in parallel to the motor 258 through the ignition switch 43, which is closed because the stack thermostatic element 106 is relatively cold. Therefore, an ignition flame or spark is established at the burner by the device 261 in any well known manner, and the operation of the burner will be established unless such operation is prevented by abnormal conditions.

If combustion is thus normally established, the stack thermostatic element 106 is gradually heated, with the result that the rod 88 is rotated thereby to open the cold contacts 79a of the stack switch, to close the hot contacts 79b of this switch, to open the ignition switch 43, and to open the recycling switch 84, all in the sequence named. The closing of the hot contacts 79b and subsequent opening of the recycling switch 84 transfer the control circuit from the latter switch to the former, and the opening of the cold contacts 79a of the stack switch deenergizes the pull coil 66, but has no effect upon the energization of the hold coil 67. The motor switch 36 is, therefore, also maintained in closed position to continue the operation of the motor or other actuating apparatus 258. The opening of the ignition switch 43 deenergizes the ignition apparatus 261, which is not required to be operated after the establishment of combustion in the furnace or combustion chamber.

Operation of the heating system will now normally continue until either the room thermostatic switch 266 or the switch 267 of the boiler control or similar device is opened. Opening of either of these switches interrupts the series control circuit to deenergize the hold coil 67, which thereupon permits the motor switch 36 to be opened by the action of gravity upon the weight 135, and this opening of the motor switch deenergizes the motor or other actuating apparatus 258 to terminate the operation of the heating system.

A substantial interval of time is required for the stack thermostatic element 106 to return to its relatively cold condition, and during this interval of cooling the hot contacts 79b are opened, the cold contacts 79a are reclosed, the ignition switch 43 is reclosed, and the recycling switch 84 is reclosed, all of these operations taking place in the sequence named. It is necessary that all of these operations take place before the operation of the heating system can be restarted, since the motor switch 36 cannot be reclosed until the pull coil 66 is again energized and this energization must be preceded by reclosing of the cold contacts 79a of the stack switch 79; and since the hot contacts 79b are open at the time the cold contacts 79a are reclosed, it is necessary that the recycling switch 84 be reclosed before the control circuit can be reestablished. Consequently a predetermined time delay between successive periods of operation of the heating system is insured by reason of the delayed reclosing of the recycling switch 84 on account of the curved or humped formation of the container tube for this switch, as previously described.

Referring back to the time when the pull coil 66 and the hold coil 67 were initially energized in response to a demand for heat in the space to be heated, it will be seen that the energizing current for both of these coils must traverse the electrical heating element 62 and the switch 60 that is controlled thereby. The heating element 62 is so designed that the current required to energize the hold coil 67 will not raise the temperature of said heating element sufficiently to cause the thermostatic element 63 to disengage the downwardly extending portion 149 of the pivoted member 140, but the combined current taken by the coils 66 and 67 will effect such deflection of the member 63 after a predetermined interval of time, depending upon the adjustment of the supporting member 142 for the switch 60, as previously described. Therefore, if combustion is not established in the furnace or combustion chamber within a suitable interval of time after the energization of the motor 258 and the ignition apparatus 261, the switch 60 will be opened at the end of such interval by reason of the fact that both the pull coil 66 and the hold coil 67 are energized as long as combustion is not established and the cold contacts 79a of the stack switch therefore remain closed.

Upon opening of the switch 60 in this manner the control circuit, including the pull coil 66 and hold coil 67, is interrupted with the result that the motor switch 36 is opened to terminate the operation of the heating system. Such operation cannot be resumed until the switch 60 is reclosed and this switch can be reclosed only by manual depression of the handle lever 157 at the righthand side of the casing for the control apparatus, as heretofore set forth. Therefore, only a predetermined interval of operation of the heating system is permitted in the absence of proper establishment of combustion. Moreover, a failure of combustion, after proper establishment thereof, will cause the cold contacts 79a of the stack switch to be reclosed in a relatively short interval of time and thereupon the pull coil 66 is reenergized and the electrical heating element 62 is again subjected to the combined energizing currents of the two coils 66 and 67 which, if maintained for a predetermined interval of time, will result in the opening of the switch 60 in the same manner as though establishment of combustion were delayed for a similar interval of time when the control circuit was initially energized.

During this period, however, the ignition switch 43 is also reclosed and energization of the ignition apparatus 261 is reestablished so that an attempt is made to reignite the burner. If combustion is reestablished in this manner, the stack switch 79 will return to its hot position to deenergize the pull coil 66 and thereby to prevent continued excessive energization of the electrical heating element 62. If the energization of the pull coil 66 is cut off in this manner, the heating element 62 will not effect opening of the switch 60 and operation of the heating system will not be interrupted.

It will be seen from the above description that the apparatus herein disclosed may be utilized to insure the desired operating and protective features of a burner control system. These features are, in general, the initiation and termination of operation of the system under normal conditions in accordance with the temperature of the space to be heated, but subject to the condition of the furnace or boiler as indicated by the boiler control or similar device 267, since the switch of this latter device is connected in series with that of the room thermostat in the control circuit; the termination of operation of the heating system upon a failure to establish combustion within a predetermined interval of time following initial energization of the actuating and igniting apparatus for the burner or following a failure of combustion after proper initial establishment thereof; and the provision of a predetermined interval of time delay between successive periods of operation of the heating system, the latter feature being provided for the purpose of preventing undesirable or hazardous conditions which may result from an attempt to restart the operation of the heating system too soon after termination of the next preceding period of operation.

The modified system of circuit connections shown in Fig. 15 is designed to provide the same operating and protective features that are obtained with the system illustrated in Fig. 14, but certain minor changes in the circuit connections are shown to illustrate the fact that the apparatus herein disclosed is not limited to use in a single control system. In Fig. 15 the switch 267 of the boiler control or similar device is shown as being disposed in series with the current supply conductor 256, whereby opening of this switch will interrupt the supply of current to all of the controlling and actuating apparatus of the system. This switch is equally effective, whether located in the control circuit as shown in Fig. 14, or in the supply circuit as shown in Fig. 15, and this slight modification is illustrated merely to show another suitable method of connecting the said boiler control or similar switch in the system. When the switch 267 is connected in the supply circuit, as shown in Fig. 15, the conductors 269 and 270, which are respectively connected to the terminals 30 and 31 of the control apparatus, will ordinarily extend from said apparatus to the switch 266 of the room thermostatic device alone, although other control devices may be connected in series therewith, if desired.

Another circuit modification illustrated in Fig. 15 lies in the manner of connecting the hold coil 67 and the hot contacts 79b of the stack switch in the control circuit. These two elements are now shown connected in series with each other, and the branch circuit thus formed is connected in parallel relation to a portion of the control circuit comprising the cold contacts 79a, the recycling switch 84, the pull coil 66, and the electrical heating element 62. With these connections, only the pull coil 66 and the electrical heating element 62 are energized upon initial closing of the control circuit, since the hold coil 67 cannot be energized until the hot contacts 79b of the stack switch are closed in response to the establishment of combustion. When the hold coil 67 is energized in response to this condition, the pull coil 66 and the heating element 62 are deenergized at substantially the same instant, it being necessary with this circuit arrangement to utilize a stack switch 79 in which the hot contacts 79b are closed before the cold contacts 79a are opened, in order to prevent opening of the motor 36 due to a momentary deenergization of both of the coils 66 and 67, which would otherwise result. This operation of the stack switch 79 may be secured, in case a mercury switch is utilized as disclosed in connection with the first described embodiment of the invention, by providing such switches with a sufficient quantity of mercury to overlap both pairs of electrodes at the instant when the switch moves from its cold to its hot position. This type of stack switch is known as the "overlapping" type, and has been disclosed in copending application Serial No. 337,333, filed February 4, 1929, by Lawrence E. Koch, and assigned to the assignee of the present application. In the partial modifications of the present invention shown in Figs. 8 to 13, inclusive, however, exposed contacts are utilized in place of the mercury contactor stack switch 79 and these contacts are so arranged in each case that the hot contacts are closed before the cold contacts are opened, since the opening of the cold contacts is effected by movement of the middle contact carrying member 194 in Figs. 8 and 9, or 226 in Figs. 10, 11, 12 and 13, and this movement of the middle contact carrying member is effected only after engagement of the hot contacts and continued movement of the actuating member thereafter.

It will also be observed that in the system of circuit connections illustrated in Fig. 15, the energizing current for the hold coil 67 does not traverse the electrical heating element 62, since the conductor 65 is connected to the conductor 61 instead of the conductor 64, the heating element 62 thus being energized only by the energizing current for the pull coil 66. In this modification, therefore, the heating element 62 will be so designed that it will effect opening of the switch 60 after a predetermined period of energization of the pull coil 66 alone, whereas in the embodiment illustrated in Fig. 14 the heating element 62 is adapted to open the switch 60 after it has been traversed by the energizing current for both of the coils 66 and 67 for a predetermined interval of time, as previously described.

It will be noted further that in the system shown in Fig. 15, the hot contacts 79a of the stack switch and the contacts of the recycling switch 84 are interchanged in their positions in the control circuit, but both of these switches are still connected in series with the pull coil 66. The reason for interchanging the positions of these two switches in this manner is to retain an arrangement in which the cold contacts 79a and the hot contacts 79b have one common connection to conform to the arrangement of these contacts as disclosed in each of the embodiments of the apparatus herein disclosed. With this arrangement one contact of the recycling switch 84 is connected to the pull coil 66 through the conductor 76 and the other contact of said switch is connected to the outside one of the two cold contacts 79a, as indicated at 271, which is in accordance with the arrangement of the two contact carrying members 229 and 214, as shown in Figs. 10 and 11, and 229 and 252, as shown in Figs. 12 and 13, while the conductor 80, which is connected in common to one of each of the pairs of contacts 79a and 79b extends to a point of connection to the conductor 269, and the conductor 83, rather than the conductor 80, is connected to the hold coil 67 through the conductor 82. It will be understood, of course, that where it is not desired to utilize these circuit connections, the contact carrying members referred to may be insulated from each other and connected in any desired manner with respect to the other contact carrying members, and that the connections of the apparatus disclosed in the other figures of the drawings may likewise be made to conform to any desired circuit arrangement.

The system of Fig. 15 accomplishes the same features of operation and protection as that illustrated in Fig. 14, since opening of the switch 60 in response to an excessive period of energization of the pull coil 66 and of the electrical heating element 62 by reason of the failure to establish combustion within a predetermined interval of time or failure of combustion for a predetermined interval of time after establishment thereof will interrupt the control circuit and prevent further operation of the system until said switch 60 is manually reset; and since the disposition of the recycling switch 84 in series with the circuit of the pull coil 66 prevents reenergization of the pull coil 66 to restart the operation of the system until a suitable interval of time after termination of the next preceding cycle of operation of the system.

It will be seen from the foregoing description that the present invention provides an advantageous assembly of several of the units of a burner control system, and also provides novel and advantageous features of construction, installation and interconnection of such units. It will be understood that the invention is adapted to numerous other modifications in the details of construction and circuit connection and that it is not specifically limited to any of the embodiments herein disclosed.

What is claimed as new and is desired to secure by Letters Patent, therefore, is:

1. An electrical control system for oil burners or the like including fuel supplying means and actuating means therefor, comprising a switch for controlling the energization of said actuating means, a pull coil for closing said switch, a hold coil of only sufficient strength to maintain said switch closed, a double-circuit switch for controlling the energization of said pull and hold coils, a separate recycling switch for supplementing the control of said pull coil to delay reenergization thereof on combustion failure, and means adapted to respond to combustion conditions established by the burner to be controlled for operating said double-circuit switch to deenergize said pull coil upon establishment of combustion conditions and for operating said recycling switch.

2. In combination, a burner motor, first and second cold switches, a hot switch, an actuator responsive to combustion conditions, connections between said actuator and switches for opening said first cold switch and closing said hot switch substantially immediately upon establishment of combustion and thereafter opening said second cold switch and for substantially immediately opening said hot switch and closing said first cold switch but delaying closing of said second cold switch for a substantial interval upon cessation of combustion, a main switch, an electrically operable time switch, means controlled by said main switch and the two cold switches for initiating burner motor operation and operatively energizing the time switch operator, and means controlled by opening of said first cold switch and closing of said hot switch for maintaining burner motor operation but operatively deenergizing said time switch operator independently of said second cold switch.

3. In combination, a burner motor, an actuator responsive to combustion conditions, switching means, connections between said actuator and switching means for moving the latter to a new circuit controlling position immediately upon the establishment of combustion and for immediately returning the same to its original position upon cessation of combustion, a cold switch responsive to combustion conditions which is closed only after a delayed interval upon cessation of combustion, an electrically operable time switch adapted to render the system inoperative until manual intervention if operatively energized for a predetermined length of time, a main control switch, means under the control of said main control switch and said cold switch for initiating operation of said burner motor and operatively energizing said time switch operator only when both said switches are closed, and means under the control of said main control switch and said switching means for maintaining burner motor energization and operatively deenergizing said time switch operator immediately upon establishment of combustion but immediately interrupting burner motor energization upon actuation of said switching means in response to a failure of flame during normal operation of the system, whereby said time switch is rendered inoperative immediately upon establishment of combustion irrespective of the condition of said cold switch and upon a failure of flame during normal operation said burner motor is immediately shut down by said switching means and the time switch maintained inoperative until reclosure of said cold switch, whereupon a new attempt to reestablish combustion is made.

4. In combination, a burner motor, an actuator responsive to combustion conditions, switching means, non-positive transmission means between said actuator and switching means for moving the latter to a new circuit controlling position upon initial movement of the actuator in one direction upon the establishment of combustion and for immediately returning the same to its original position upon initial reverse movement of said actuator when combustion ceases, a cold switch responsive to combustion conditions which is closed only after a delayed interval upon cessation of combustion, an electrically operable time switch adapted to render the system inoperative until manual intervention if operatively energized for a predetermined length of time, a main control switch, means under the control of said main control switch and said cold switch for initiating operation of said burner motor and operatively energizing said time switch operator only when both said switches are closed, and means under the control of said main control switch and said switching means for maintaining burner motor energization and operatively deenergizing said time switch operator immediately upon establishment of combustion but immediately interrupting burner motor energization upon actuation of said switching means in response to a failure of flame during normal operation of the system, whereby said time switch is rendered inoperative immediately upon establishment of combustion irrespective of the condition of said cold switch and upon a failure of flame during normal operation said burner motor is immediately shut down by said switching means and the time switch maintained inoperative until reclosure of said cold switch, whereupon a new attempt to reestablish combustion is made.

5. In combination, a burner motor, a motor switch, a burner motor circuit controlled thereby, electromagnetic means for closing said motor switch when energized, an actuator responsive to combustion conditions, switching means, connections between said actuator and switching means for moving the latter to a new circuit controlling position immediately upon the establishment of combustion and for immediately returning the same to its original position upon cessation of combustion, a cold switch responsive to combustion conditions which is closed only after a delayed interval upon cessation of combustion, an electrically operable time switch adapted to render the system inoperative until manual intervention if operatively energized for a predetermined length of time, a main control switch, circuit connections under the control of said main control switch and said cold switch for initially energizing said electromagnetic means and operatively energizing said time switch operator only when both said switches are closed, and circuit connections under the control of said main control switch and said switching means for maintaining energization of the electromagnetic means and operatively deenergizing said time switch operator immediately upon establishment of combustion but immediately interrupting burner motor energization upon actuation of said switching means in response to a failure of flame during normal operation of the system, whereby said time switch is rendered inoperative immediately upon establishment of combustion irrespective of the condition of said cold switch and upon a failure of flame during normal operation said burner motor is immediately shut down by said switching means and the time switch maintained inoperative until reclosure of said cold switch, whereupon the system recycles in an attempt to reestablish combustion.

6. In combination, a burner motor, a motor switch, electromagnetic means for controlling said motor switch and selectively energizable either to cause the same to actuate said motor switch from open to closed position or to render the same capable of maintaining said motor switch closed but incapable of closing it, an actuator responsive to combustion conditions, switching means, connections between said actuator and switching means for moving the latter to a new circuit controlling position immediately upon the establishment of combustion and for immediately returning the same to its original position upon cessation of combustion, a cold switch responsive to combustion conditions which is closed only after a delayed interval upon cessation of combustion, an electrically operable time switch adapted to render the system inoperative until manual intervention if operatively energized for a predetermined length of time, a main control switch, circuit connections controlled by said main control switch and said cold switch for initially energizing said electromagnetic means to close said motor switch and for operatively energizing said time switch operator only when both said switches are closed, and circuit connections controlled by said main control switch and said switching means for changing the energization of said electromagnetic means to cause the same to maintain the motor switch closed but to render the same incapable of closing said motor switch, and for operatively deenergizing said time switch operator immediately upon establishment of combustion, whereby said time switch is rendered inoperative immediately upon establishment of combustion irrespective of the condition of said cold switch and upon a failure of flame during normal operation said burner motor is shut down and the time switch maintained inoperative until reclosure of said cold switch.

7. In combination, a burner motor, a motor switch, electromagnetic means for controlling the operation of said switch, an actuator responsive to combustion conditions, switching means, connections between said actuator and switching means for moving the latter to a new circuit controlling position immediately upon the establishment of combustion and for immediately returning the same to its original position upon cessation of combustion, a cold switch responsive to combustion conditions which is closed only after a delayed interval upon cessation of combustion, an electrically operable time switch adapted to render the system inoperative until manual intervention if operatively energized for a predetermined length of time, a main control switch, circuit connections controlled by said main control switch and said cold switch for effecting energization of said electromagnetic means to actuate said motor switch from open to closed position to initiate operation of said burner motor, and for operatively energizing said time switch operator, only when both said switches are closed, and circuit connections controlled by said main control switch and said switching means for operatively deenergizing said time switch operator immediately upon establishment of combustion and normally maintaining energization of said electromagnetic means to maintain burner motor energization but rendering said electromagnetic means incapable of reclosing said motor switch on restoration of power supply after momentary failure thereof, whereby said time switch is rendered inoperative immediately upon establishment of combustion irrespective of the condition of said cold switch and upon a failure of either flame or power during normal operation said burner motor is shut down and the time switch maintained inoperative until reclosure of said cold switch.

8. In combination, a burner motor, a motor switch, electromagnetic means in control thereof, first and second cold switches, a hot switch, an actuator responsive to combustion conditions, connections between said actuator and said cold and hot switches for opening said first cold switch and closing said hot switch immediately upon establishment of combustion and thereafter opening said second cold switch, and for immediately opening said hot switch and closing said first cold switch but delaying closing of said second cold switch for a substantial interval upon cessation of combustion, a main switch, an electrically operable time switch for rendering the system inoperative when energized for a predetermined length of time, circuit connections including said main switch and both cold switches for effecting partial initial energization of said time switch operator and said electromagnetic means, circuit connections including said main switch and said second cold switch for simultaneously effecting sufficient further energization of said time switch operator and said electromagnetic means to provide operative energization for said time switch operator until said first cold switch opens and to cause said motor switch to be closed and thereafter maintained closed after said first cold switch opens, and circuit connections controlled by said main switch and hot switch for maintaining sufficient energization of said electromagnetic means to maintain said motor switch closed after said second cold switch opens.

9. In combination, a burner motor, a motor switch, electromagnetic means in control thereof, first and second cold switches, a hot switch, a thermal actuator responsive to changes in the temperature of combustion, connections between said actuator and said cold and hot switches for immediately closing said hot switch, immediately thereafter opening said first cold switch, and thereafter opening said second cold switch upon increase in the temperature of combustion, and for immediately opening said hot switch, immediately thereafter closing said first cold switch but delaying reclosure of said second cold switch upon a decrease in the temperature of combustion, a main control switch, an electrically operable time switch for terminating burner motor operation if operatively energized for a predetermined length of time, circuit connections controlled by said main control switch and both cold switches for energizing the time switch operator and at least a portion of said electromagnetic means to close said motor switch, and circuit connections controlled by said main switch and hot switch for energizing another portion of said electromagnetic means sufficiently to maintain said motor switch closed but rendering the electromagnetic means incapable of closing said motor switch, whereby opening of said first cold switch operatively deenergizes said time switch operator prior to opening of said second cold switch and whereby said motor is deenergized upon opening of said hot switch upon a failure of flame and can only be reenergized concurrently with said time switch operator after the delayed reclosure of said second cold switch.

10. In combination, a burner motor, a motor switch, a pull coil for closing said switch when energized, a hold coil capable of holding said switch closed but incapable of closing the same when energized, first and second cold switches, a hot switch, a thermal actuator responsive to changes in the temperature of combustion, connections between said actuator and said cold and hot switches for immediately closing said hot switch, immediately thereafter opening said first cold switch, and thereafter opening said second cold switch upon increase in the temperature of combustion, and for immediately opening said hot switch, immediately thereafter closing said first cold switch but delaying reclosure of said second cold switch upon cessation of combustion, a main control switch, an electrically operable time switch for terminating burner motor operation if operatively energized for a predetermined length of time, circuit connections controlled by said main switch and both cold switches for energizing the time switch operator and said pull coil to close said motor switch, and circuit connections controlled by said main switch and hot switch for energizing said hold coil to maintain said motor switch closed, whereby opening of said first cold switch operatively deenergizes said time switch operator and pull coil prior to opening of said second cold switch and whereby said motor is deenergized upon opening of said hot switch upon a failure of flame and can only be reenergized as a result of energization of said pull coil concurrently with energization of said time switch operator after the delayed reclosure of said second cold switch.

11. In combination, a burner motor, a motor switch, electromagnetic means in control thereof, first and second cold switches, a hot switch, an actuator responsive to changes in combustion conditions, connections between said actuator and said cold and hot switches for quickly closing said hot switch, immediately thereafter opening said first cold switch and then opening said second cold switch upon the establishment of combustion, and for quickly opening said hot switch and closing said first cold switch but delaying reclosure of said second cold switch upon cessation of combustion, a main control switch, an electro-thermal time switch including an electric heating element for terminating burner motor operation if the heating element is energized for a predetermined length of time, a circuit for closing the motor switch including said main control switch, both cold switches, at least a portion of the electromagnetic means and said electric heating element in series, and a circuit including said main control switch, hot switch and another portion of said electromagnetic means in series to maintain said motor switch closed after opening of said first cold switch but incapable of actuating said motor switch from open to closed position, whereby opening of the first cold switch interrupts the initial circuit to deenergize said heating element and whereby said motor switch is opened as a direct result of opening of said hot switch upon a failure of flame and can only be reclosed after the delayed closure of said second cold switch.

12. In combination, a burner motor, a motor switch, a pull coil for closing said motor switch when energized, a hold coil capable of holding said motor switch closed but incapable of closing the same when energized, first and second cold switches, a hot switch, an actuator responsive to changes in combustion conditions, connections between said actuator and said cold and hot switches for quickly closing said hot switch, then quickly opening said first cold switch and thereafter opening said second cold switch upon the establishment of combustion, and for quickly opening said hot switch and closing said first cold switch but delaying closing of said second cold switch upon cessation of combustion, a main control switch, a thermo-electric time switch including an electric heating element for terminating burner motor operation if said heating element is energized for a predetermined length of time, an energizing circuit including said main control switch, both cold switches, pull coil and heating element in series for closing said motor switch, and an energizing circuit including said main control switch, hot switch and hold coil in series, but independent of said cold switches and heating element, for maintaining said motor switch closed and for allowing said heating element to be quickly deenergized by opening of said first cold switch upon the establishment of combustion whereby opening of said hot switch upon a failure of flame during normal operation immediately causes opening of said motor switch, which can only be reclosed concurrently with a reenergization of said heating element upon the delayed reclosure of said second cold switch.

JOHN C. BOGLE.